(12) United States Patent
Zhang et al.

(10) Patent No.: US 9,152,826 B2
(45) Date of Patent: Oct. 6, 2015

(54) DAMAGE DETECTION FOR AN ANTI-THEFT INTERFACE

(75) Inventors: Wan-Li Zhang, Shanghai (CN); Adnan A. Siddiquie, Houston, TX (US); Jeffrey A. Lev, Cypress, TX (US); Michael J. Dougherty, Houston, TX (US); Earl W. Moore, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1258 days.

(21) Appl. No.: 11/554,926

(22) Filed: Oct. 31, 2006

(65) Prior Publication Data

US 2008/0106366 A1 May 8, 2008

(51) Int. Cl.
*G08B 13/14* (2006.01)
*G06F 21/88* (2013.01)
*G08B 13/00* (2006.01)
*G08B 13/06* (2006.01)

(52) U.S. Cl.
CPC .............. *G06F 21/88* (2013.01); *G08B 13/00* (2013.01); *G08B 13/06* (2013.01)

(58) Field of Classification Search
CPC ...................................................... G08B 13/00
USPC ............... 340/568.1, 568.2, 565, 571, 572.1, 340/572.3, 572.4
See application file for complete search history.

(56) References Cited

U.S. PATENT DOCUMENTS

| | | | | |
|---|---|---|---|---|
| 4,543,458 A * | 9/1985 | Holce et al. | ............... | 200/61.7 |
| 5,687,387 A * | 11/1997 | Endejan et al. | ............... | 710/2 |
| 6,014,747 A * | 1/2000 | Fackenthall et al. | ............. | 726/34 |
| 6,087,937 A * | 7/2000 | McCarthy | ............... | 340/567 |
| 6,137,409 A * | 10/2000 | Stephens | ............... | 340/568.1 |
| 6,163,361 A * | 12/2000 | McIntyre et al. | ............... | 355/18 |
| 6,227,017 B1 * | 5/2001 | Igelmund | ............... | 70/58 |
| 6,300,873 B1 * | 10/2001 | Kucharczyk et al. | ...... | 340/568.1 |
| 6,307,738 B1 * | 10/2001 | Tran et al. | ............... | 361/679.57 |
| 6,389,853 B1 * | 5/2002 | Pate et al. | ............... | 70/18 |
| 6,389,854 B1 * | 5/2002 | Huang | ............... | 70/58 |
| 6,434,697 B1 * | 8/2002 | Leyda et al. | ............... | 713/2 |
| 6,459,374 B1 * | 10/2002 | Rand et al. | ............... | 340/568.2 |
| 6,489,890 B1 * | 12/2002 | Inoue | ............... | 340/568.1 |
| 6,504,480 B1 * | 1/2003 | Magnuson et al. | ........... | 340/571 |
| 6,755,056 B2 * | 6/2004 | Igelmund | ............... | 70/58 |
| 6,795,926 B1 * | 9/2004 | Matula et al. | ............... | 713/300 |
| 6,867,685 B1 * | 3/2005 | Stillwagon | ............... | 340/5.64 |
| 7,026,933 B2 * | 4/2006 | Kim | ............... | 340/568.1 |
| 7,100,210 B2 * | 8/2006 | Kuo et al. | ............... | 726/34 |
| 7,323,986 B2 * | 1/2008 | Hunter et al. | ............... | 340/545.6 |
| 7,332,728 B2 * | 2/2008 | Beinhocker | ............... | 250/474.1 |
| 7,408,126 B2 * | 8/2008 | Liu et al. | ............... | 200/43.01 |
| 7,456,736 B2 * | 11/2008 | Primm et al. | ............... | 340/540 |
| 7,467,401 B2 * | 12/2008 | Cicchitto | ............... | 726/4 |
| 7,496,961 B2 * | 2/2009 | Zimmer et al. | ............... | 726/23 |
| 7,644,290 B2 * | 1/2010 | Ransom et al. | ............... | 713/194 |
| 2001/0011947 A1 * | 8/2001 | Jaber et al. | ............... | 340/568.1 |
| 2002/0171546 A1 * | 11/2002 | Evans et al. | ............... | 340/540 |
| 2003/0097596 A1 * | 5/2003 | Muratov et al. | ............... | 713/202 |
| 2005/0231365 A1 * | 10/2005 | Tester et al. | ............... | 340/568.1 |
| 2006/0049941 A1 * | 3/2006 | Hunter et al. | ............... | 340/545.6 |
| 2006/0107073 A1 * | 5/2006 | Lane et al. | ............... | 713/194 |
| 2007/0040678 A1 * | 2/2007 | Kojo | ............... | 340/568.1 |

\* cited by examiner

*Primary Examiner* — Jennifer Mehmood
*Assistant Examiner* — Rufus Point
(74) *Attorney, Agent, or Firm* — Conley Rose

(57) ABSTRACT

An electronic device is provided, the electronic device having an anti-theft interface. If damage to the anti-theft interface is detected, the electronic device enters a user authentication mode.

18 Claims, 3 Drawing Sheets

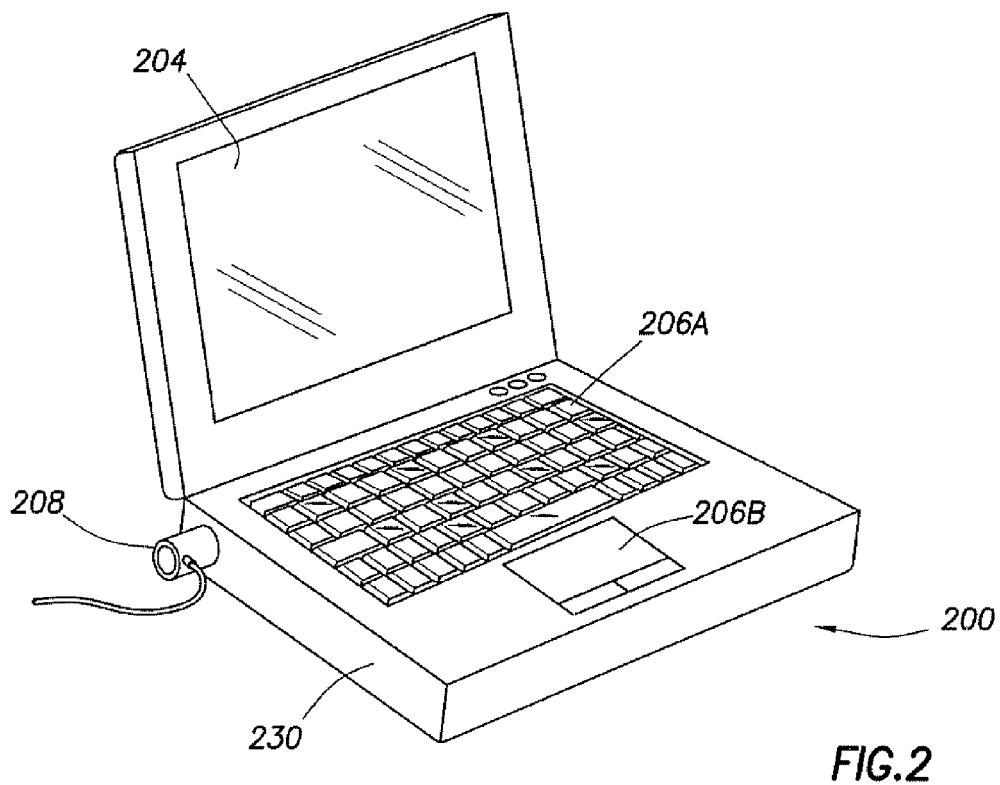
FIG.2
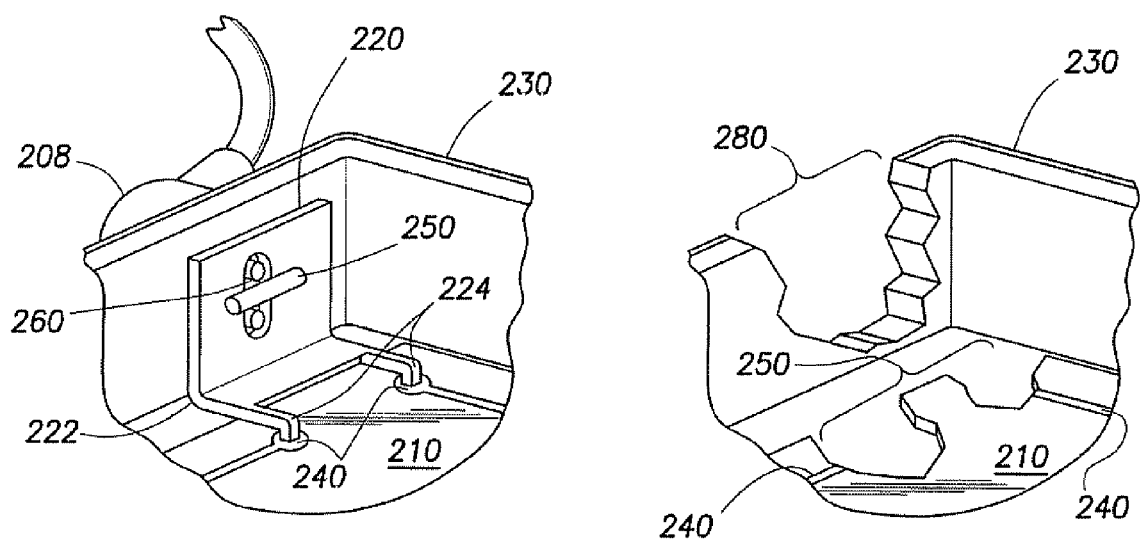
FIG.3
FIG.4

DAMAGE DETECTION FOR AN ANTI-THEFT INTERFACE

BACKGROUND

Some electronic devices are equipped with anti-theft mechanisms. Unfortunately, an aggressive thief may be able to destroy or otherwise disable the anti-theft mechanism. For example, some laptops have an interface for attaching or releasing a cable lock. The cable lock can be wrapped around another object and attached to the laptop to prevent the laptop from being removed from the object. Even with the cable lock attached, an aggressive thief can steal a laptop by cutting the cable or by breaking the interface that attaches the laptop to the cable lock.

BRIEF DESCRIPTION OF THE DRAWINGS

For a detailed description of exemplary embodiments of the invention, reference will now be made to the accompanying drawings in which:

FIG. 2 illustrates a laptop in accordance with embodiments;

FIG. 3 illustrates an anti-theft interface for the laptop of FIG. 2 in accordance with embodiments;

FIG. 4 illustrates a damaged anti-theft interface for the laptop of FIG. 2 in accordance with embodiments;

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

Embodiments comprise electronic devices having an anti-theft mechanism. In at least some embodiments, an electronic device is able to detect if the anti-theft mechanism is damaged. In response to detecting a damaged anti-theft mechanism, embodiments are selectively disabled. For example, a user authentication could be performed in response to detecting a damaged anti-theft mechanism. If user authentication is successful, the electronic device is enabled for use. If user authentication fails, the electronic device is disabled or some other theft response is performed.

Figure 1:
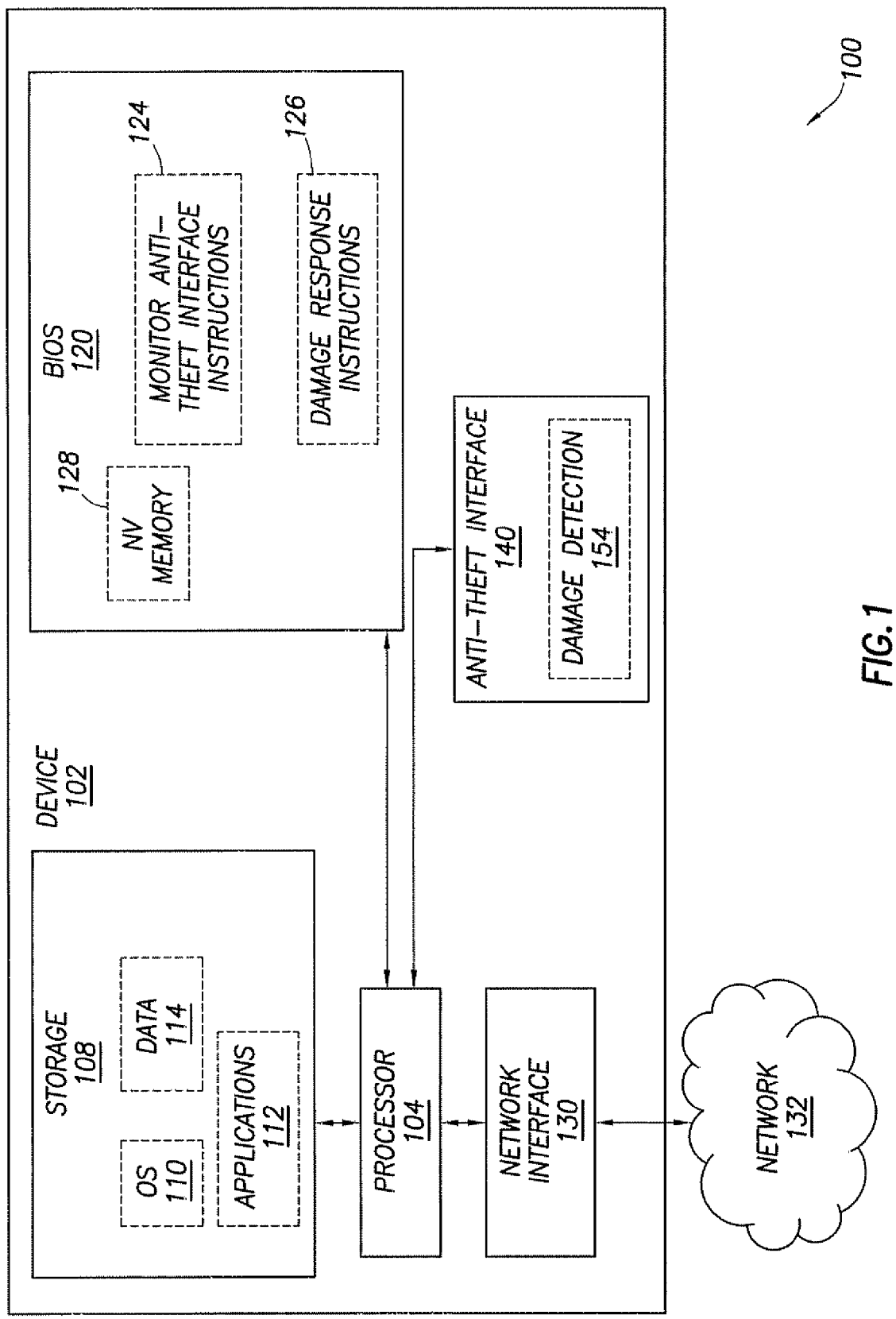
FIG. 1 illustrates a system in accordance with embodiments.

FIG. 1 shows a system 100 in accordance with embodiments. As shown in FIG. 1, the system 100 comprises a device 102 which may be, for example, a desktop computer or a laptop computer. The device 102 comprises a processor 104 coupled to a storage 108. The storage 108 comprises a computer-readable medium such as volatile storage (e.g., random access memory), non-volatile storage (e.g., hard disk drive), optical disk storage, "flash" memory or a combination thereof. As shown, the storage 108 stores an operating system (OS) 110 and other applications 112 which are executable by the processor 104. The storage 108 also stores data 114.

The device 102 also comprises a network interface 130 coupled to the processor 104. The network interface 130 enables the device 102 to send data to and/or receive data from a network 132 via a wired or wireless connection. The network interface 130 may take the form of modems, modem banks, Ethernet cards, Universal Serial Bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, or other network interfaces.

As shown, the device 102 further comprises an anti-theft interface 140 coupled to the processor 104. In some embodiments, the anti-theft interface 140 is in communication with firmware (e.g., the Basic Input/Output System (BIOS)) or hardware of the device 102, and does not necessarily interact with the processor 104. The anti-theft interface 140 is configured to prevent theft of the device 102. For example, in at least some embodiments, the anti-theft interface 140 enables a cable lock to selectively attach to the device 102. Other anti-theft interfaces now known or later developed could alternatively be implemented.

As shown, the anti-theft interface 140 comprises a damage detection component 154 for detecting if the anti-theft interface 140 becomes damaged. In at least some embodiments, the damage detection component 154 comprises a conductive material that completes a circuit. In such case, damage to the anti-theft interface 140 causes the circuit to break (an open circuit). If an open circuit is detected, the device 102 determines if a theft has occurred and responds accordingly. For example, in some embodiments, the device 102 shuts down (powers off) if damage is detected. Additionally or alternatively, the device 102 enters a user authentication mode. The user authentication mode may occur before the device 102 powers off or during a subsequent boot process. If the user is authenticated, the device 102 is enabled even though the anti-theft interface 140 is damaged. If the user is not authenticated, the device 102 is disabled or some other theft response occurs. As an example, a theft response may comprise disabling the device 102, disabling predetermined functions of the device 102, disabling access to data (e.g., some or all of the data 114) stored on the device 102, deleting predetermined data (e.g., some or all of the data 114) stored on the device 102, or sending an alert (SOS) via the network interface 130. The alert can be used to trigger an alarm (e.g., in a building) or other responses. The alert could also be used track the device 102.

As shown, the device 102 further comprises a Basic Input/Output System (BIOS) 120 in communication with the processor 104. In at least some embodiments, the BIOS 120 stores monitor anti-theft interface instructions 124 that, when executed, enable the device 102 to monitor the anti-theft interface 140 for damage. For example, the monitor anti-theft interface instructions 124 may periodically cause the processor 104 to verify the status of an anti-theft interface damage indicator or signal. In some embodiments, the anti-theft interface damage signal indicates damage based on whether the damage detection component 154 completes a circuit or not (e.g., an open circuit indicates damage and a closed circuit indicates no damage). In alternative embodiments, the anti-theft interface 140 asserts an interrupt to the processor 104 if the damage detection component 154 indicates damage has occurred. Regardless of the manner in which damage is detected, the BIOS 120 receives notification if the anti-theft interface 140 becomes damaged. In response the damage response instructions 126 of the BIOS 120 are executed by the processor 104.

When executed, the damage response instructions 126 enable the device 102 to be selectively disabled or to perform some other theft response. In some embodiments, the damage response instructions 126 cause the device 102 to shut down (power off) if damage to the anti-theft interface 140 is indicated. Additionally or alternatively, the device 102 enters a user authentication mode. The user authentication mode may occur before the device 102 powers off or during a subsequent boot process. If the user authentication mode occurs during a subsequent boot process, the BIOS 120 stores information corresponding to the status of the anti-theft interface damage indicator in a non-volatile memory 128 accessible to the BIOS 120. During the subsequent boot process, the BIOS 120 enters the user authentication mode upon verifying the status of the anti-theft interface damage indicator in the non-volatile (NV) memory 128. Embodiments are not limited as to when the monitoring and the damage response occurs. In other words, an without limitation, either of the monitor anti-theft interface instructions 124 or the damage response instructions 126 could be executed only during a boot process, only during run-time or during both a boot process and run-time.

In some embodiments, the user authentication mode is implemented during each boot process until the anti-theft interface 140 is repaired. In such case, the user authentication mode can be entered only a predetermined number of times before the device 102 is disabled. Preferably, repairing the anti-theft interface 140 involves a private action known only to a manufacturer or an authorized vendor of the device 102. In other words, simply restoring or emulating the function of the damage detection component 154 does not necessarily indicate that the anti-theft interface 140 has been repaired.

During the user authentication mode, any of a variety of user authentication techniques now known or later developed can be implemented. In at least some embodiments, user authentication is based on a password, a smartcard, biometric measurements or a combination thereof. If the user is authenticated, the damage response instructions 126 enable the device 102 to be used even though the anti-theft interface 140 is damaged. If the user is not authenticated, the damage response instructions 126 disable the device 102 or cause some other theft response. As an example, a theft response may comprise disabling the device 102, disabling predetermined functions (e.g., some or all of the applications 112) of the device 102, disabling access to predetermined data (e.g., some or all of the data 114) stored on the device 102, deleting predetermined data (e.g., some or all of the data 114) stored on the device 102, sending an alert (SOS) via the network interface 130, or a combination of responses. In some embodiments, the theft response is performed covertly to minimize awareness that the theft response is being performed. In some embodiments, the theft response enables at least some functions of the device to be used while covertly transmitting alerts to a network in order to track the device 102.

FIG. 2 illustrates a laptop computer 200 in accordance with embodiments. As shown in FIG. 2, the laptop computer 200 comprises a display 204 and input devices 206A (e.g., a keyboard) and 206B (e.g., a touchpad). The laptop computer 200 also comprises a chassis or housing 230 which may partially or completely house the components illustrated in FIG. 1 (e.g., the processor 104, the storage 108, the network interface 130, the anti-theft interface 140, and the BIOS 120). In FIG. 2, a cable lock 208 is shown attached to the laptop computer 200. Other anti-theft mechanisms now known or later developed could alternatively be implemented.

FIG. 3 illustrates an anti-theft interface for the laptop 200 of FIG. 2 in accordance with embodiments. In FIG. 3, the cable lock 208 attaches to the chassis 230 of the laptop 200 by inserting a rotating member 250 through an opening 260 in the chassis 230. The opening 260 also may correspond to a conductive material 220 inside the chassis 230. As desired, the cable lock 208 is attached to the laptop 200 by turning (e.g., with an appropriate key) the rotating member 250 to a "locked" position and is released from the laptop 200 by turning the rotating member 250 to an "unlocked" position. FIG. 3 shows the rotating member 250 in the locked position.

As shown in FIG. 3, the conductive material 220 completes a circuit 240. In at least some embodiments, the conductive material 220 comprises a metallic plate having pins 224 that can be soldered to a printed circuit board (PCB) 210 (e.g., a motherboard) and complete the circuit 240. As shown, the metallic plate may have a bent portion 222 that extends the metallic plate to the PCB 210. In the embodiment of FIG. 3, the opening 260 in the chassis 230 (and the conductive material 220) corresponds to an anti-theft interface 140 as discussed in FIG. 1. Also, the conductive material 220 that completes the circuit 240 corresponds to the damage detection component 154 as discussed in FIG. 1. Although FIG. 3 illustrates an embodiment for the anti-theft interface 140 and the damage detection component 154, other embodiments are possible. Also, the conductive material 220 is not limited to any particular shape, size, material, or connection to the circuit 240.

FIG. 4 illustrates a damaged anti-theft interface for the laptop 200 of FIG. 2 in accordance with embodiments. As shown in FIG. 4, the cable lock 208 has been forcibly removed from the laptop 200 leaving a damaged area 280 of the chassis 230. The PCB 210 may also have a damaged area 250. For example, a thief may have aggressively pulled the cable lock 208 or the laptop 200 may have fallen from a desk with the cable lock 208 attached. Regardless of how the damage is caused, the laptop 200 detects that the circuit 240 is no longer complete. In response to the damage, the laptop 200 enters a user authentication mode and/or performs a theft response such as the embodiments as previously described.

Figure 5:
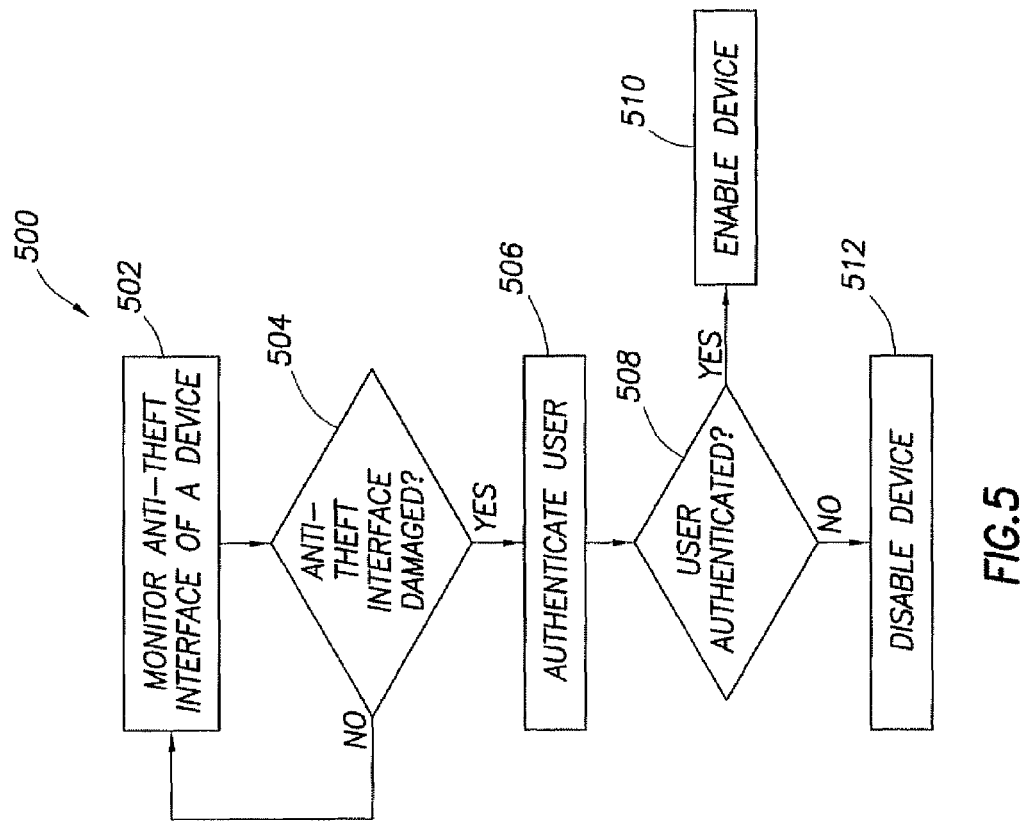
FIG. 5 illustrates a method in accordance with embodiments.

FIG. 5 illustrates a method 500, in accordance with embodiments, that comprises monitoring an anti-theft interface of a device (block 502). If the anti-theft interface is not damaged (determination block 504), the method 500 returns to block 502. If the anti-theft interface is damaged (determination block 504), a user is authenticated (block 506). For example, a user may be authenticated based on a password, smart card, biometrics or a combination thereof. The user authentication may occur during run-time or during a subsequent boot process. If a user is not authenticated (determination block 508), the device is disabled (block 512). If a user is authenticated (determination block 508), the device is enabled (block 510). In other words, a user is allowed to use the device even though the anti-theft interface is damaged.

Figure 6:
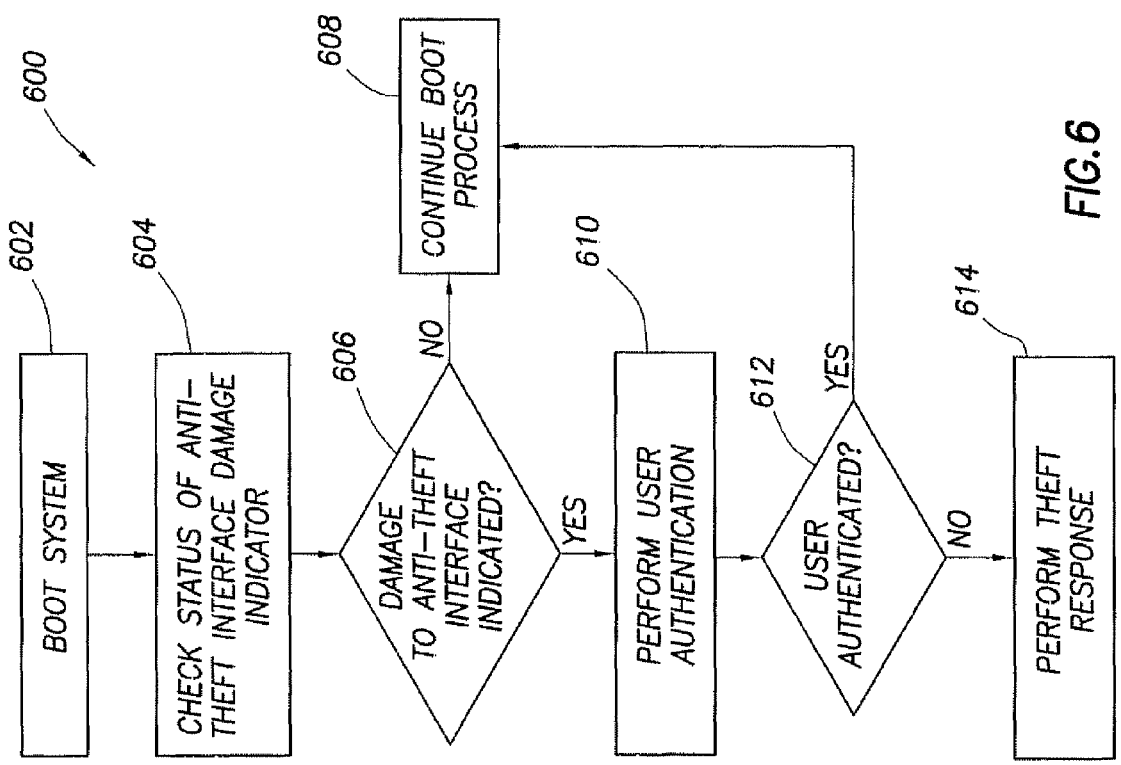
FIG. 6 illustrates another method in accordance with embodiments.

FIG. 6 illustrates another method 600, in accordance with embodiments, that comprises booting a system (block 602). During the boot process, the method 600 checks the status of an anti-theft interface damage indicator (block 604). If damage to the anti-theft interface is not indicated (determination block 606), the boot process continues (block 608). If damage to the anti-theft interface is indicated (determination block 606), a user authentication is performed (block 610). For example, user authentication may be based on a password, smart card, biometrics or a combination thereof. If a user is authenticated (determination block 612), the boot process continues (block 608). If the user is not authenticated (determination block 612), a theft response is performed (block 614). As an example, a theft response may comprise disabling the device, disabling predetermined functions of the device, disabling access to predetermined data stored on the device, deleting predetermined data stored on the device, sending an alert (SOS) via a network, or a combination of responses. The alert can be used to trigger an alarm, to trigger door locks, to track the device or some other appropriate response.

What is claimed is:

1. An electronic device, comprising:
   a chassis having an opening receptive to a corresponding member of a cable lock;
   a conductive plate permanently attached to the chassis and having an opening aligned with the opening of the chassis, the opening of the conductive plate receptive to the corresponding member of the cable lock; and
   an anti-theft interface circuit configured to detect damage to the chassis, and comprising:
      a first conductive part and a second conductive part each physically connected to the conductive plate, the conductive plate forming a conductive path between the first conductive part and the second conductive part; and
      a damage detection circuit to detect breakage of the conductive path, the breakage of the conductive path corresponding to permanent physical damage to the chassis sufficient to prevent the conductive plate from forming the conductive path,
   wherein, if damage to the anti-theft interface circuit is detected, the electronic device enters a user authentication mode,
   and wherein the conductive path is formed without the cable lock being attached to the chassis.

2. The electronic device of claim 1 wherein the electronic device monitors whether the anti-theft interface circuit is open and, if so, performs an anti-theft response.

3. The electronic device of claim 1 further comprising a Basic Input/Output System (BIOS), wherein the BIOS stores instructions that, when executed by a processor, monitor a status of an anti-theft interface circuit damage indicator that is updated in response to the anti-theft interface circuit being open.

4. The electronic device of claim 3 wherein the BIOS verifies the status of the anti-theft interface circuit damage indicator during a boot process.

5. The electronic device of claim 1 wherein if, during the user authentication mode, a user authentication is successful, the electronic device is enabled.

6. The electronic device of claim 1 wherein if, during the user authentication mode, a user authentication fails, the electronic device is disabled.

7. The electronic device of claim 1 further comprising a storage coupled to the processor wherein if, during the user authentication mode, a user authentication fails, the electronic device performs at least one of disabling access to predetermined data in the storage and deleting predetermined data in the storage.

8. The electronic device of claim 1 further comprising a network interface coupled to the processor wherein if, during the user authentication mode, a user authentication fails, the electronic device sends an alert via the network interface.

9. The electronic device of claim 8 wherein the alert is used to trigger an alarm.

10. The electronic device of claim 8 wherein the alert is used to track the electronic device.

11. A method, comprising:
    detecting if breakage of a conductive path that a conductive plate permanently attached to a chassis of an electronic device forms between a conductive path between a first conductive part and a second conductive part of an anti-theft circuit has occurred, the chassis having an opening receptive to a corresponding member of a cable lock, the conductive plate having an opening aligned with the opening of the chassis, the opening of the conductive plate receptive to the corresponding member of the cable lock, the breakage of the conductive path corresponding to permanent physical damage to the chassis sufficient to prevent the conductive plate from forming the conductive path;
    if the breakage of the conductive path is determined to have occurred, performing, by the electronic device, a user authentication;
    wherein the conductive path is formed without the cable lock being attached to the chassis.

12. The method of claim 11 further comprising enabling the electronic device if the user authentication is successful.

13. The method of claim 11 further comprising performing a theft response if the user authentication fails, wherein the theft response comprises at least one action selected from the group consisting of:
    disabling the electronic device;
    disabling a predetermined function of the electronic device;
    disabling access to predetermined data stored on the electronic device;
    deleting predetermined data stored on the electronic device; and
    sending a theft alert via a network.

14. The method of claim 11 further comprising updating an anti-theft interface circuit damage indicator stored in a non-volatile memory accessible to a Basic Input/Output System (BIOS).

15. The method of claim 11 wherein said determining if an anti-theft interface circuit of an electronic device is damaged and said performing a user authentication occurs during a boot process of the electronic device.

16. A Basic Input/Output System (BIOS) stored on a computer-readable medium, the BIOS comprising:
    monitoring instructions that, when executed, detect if breakage of a conductive path that a conductive plate permanently attached to a chassis of an electronic device forms between a conductive path between a first conductive part and a second conductive part of an anti-theft circuit has occurred, the chassis having an opening receptive to a corresponding member of a cable lock, the conductive plate having an opening aligned with the opening of the chassis, the opening of the conductive plate receptive to the corresponding member of the cable lock, the breakage of the conductive path corresponding to permanent physical damage to the chassis sufficient to prevent the conductive plate from forming the conductive path; and
    damage response instructions that, when executed, selectively perform a theft response if breakage of the conductive path is detected;

wherein the conductive path is formed without the cable lock being attached to the chassis.

17. The BIOS of claim 16 wherein the damage response instructions further cause the electronic device to enter a user authentication mode.

18. The BIOS of claim 17 wherein the theft response is performed if a user authentication fails.

* * * * *